June 23, 1953  L. N. WALTER  2,642,857
FORCED AIR FLOW AIR HEATING FURNACE
Filed March 30, 1949  4 Sheets-Sheet 1

Inventor
Leo N. Walter
By Zabel and Gritzbaugh
Attys.

June 23, 1953 L. N. WALTER 2,642,857
FORCED AIR FLOW AIR HEATING FURNACE
Filed March 30, 1949 4 Sheets-Sheet 3

Inventor
Leo N. Walter
By Zabel and Gitzbaugh
Attys.

Patented June 23, 1953

2,642,857

UNITED STATES PATENT OFFICE 2,642,857

FORCED AIR FLOW AIR HEATING FURNACE

Leo N. Walter, Lansing, Ill.

Application March 30, 1949, Serial No. 84,419

8 Claims. (Cl. 126—110)

My invention relates to a forced air heater that is constructed and operated so as to utilize without appreciable loss substantially all the heat generated by the heat source.

The practice of this invention preferably includes use of some of the prior inventions that are set forth in my prior Patents Nos. 2,391,111 and 2,437,573, as well as in my copending application Serial No. 632,150, filed December 1, 1945.

One object of my present invention is to provide a heater that, in its preferred form, uses gas, natural or manufactured, as its heat generating fuel. Other suitable fuels may be used if desired.

Another object is to provide a heater constructed and operated in such a manner that substantially all the heat generated is made available for heating the space with which the heater is used. In other words, heat losses due to incomplete combustion and heat transfer and conduction are substantially eliminated.

Another object is to utilize a plurality of heating chambers, each one of which is supplied with cool air of predetermined volume and pressure, and in which such air is heated. The air in the respective chambers is, during normal heater operation, in a continuous state of circulation. The walls of the various chambers derive heat, either directly or indirectly, from the heat source, and the air in circulating throughout the respective chambers becomes heated through contact with or radiation from the chamber walls.

Another object is to provide a means for collecting the air heated in each of the various chambers, and for delivering such collected, heated air to the space with which the heater is used.

Another object is to provide an improved combustion chamber that is constructed so as to insure substantially complete combustion of the gaseous fuel used with the heater.

Still another object is to provide a series of thermostatic controls that automatically governs the entire operation of the heater. Proper setting of the various controls insures an extreme economy of fuel consumption consistent with the demands made on the heater by external weather conditions and the characteristics of the building within which the space to be heated is located.

Other objects and advantages of my invention will be apparent as the description proceeds, reference being had to the accompanying drawings wherein one form of the invention is shown. It is to be understood that the description and drawings are illustrative only, and are not to be taken as limiting the invention except insofar as it is limited by the claims.

Figure 1:
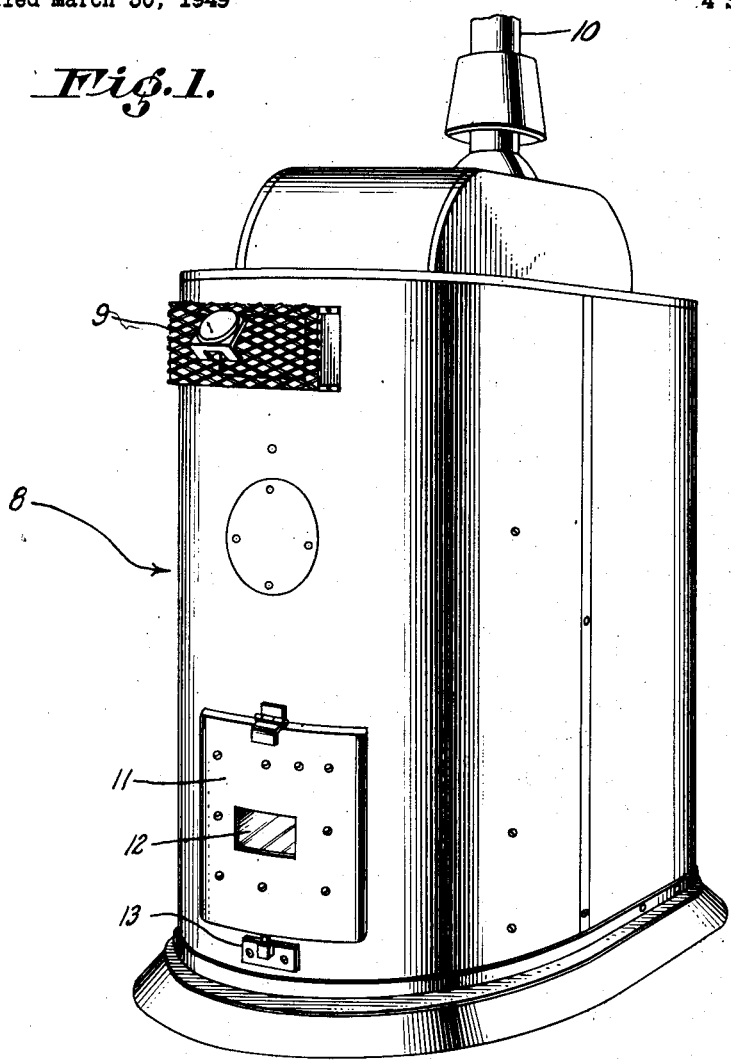
Fig. 1 is a perspective view of the exterior of a heater embodying my invention.

Referring now to the drawings, a practical form of heater embodying my invention is indicated generally by 8 in Fig. 1. It will be understood that a heater of this character may be located either within the space to be heated, or at a station remote from such space. Location in the basement of a building wherein the upper floors are to be heated is an example of the remote station type of installation.

For simplicity, the present heater is illustrated and described for location within the space to be heated. Thus, there is no hot air duct leading from the heater, but rather the heater discharges its heated air from an abbreviated outlet, generally indicated at 9, directly into the space surrounding the heater. When the heater is located at a remote station, a suitable hot air duct leads away from outlet 9.

The products of combustion are discharged in a usual manner from the heater through a flue 10 that connects to a suitable chimney (not shown).

Heater 8, still referring to Fig. 1, may be provided with a hinged front door 11 that provides easy access to the heater interior for servicing and repairs. Door 11 may have a transparent window 12 so that visual inspection of burner operation may be conveniently made from time to time. Door latch 13 may be of an automatically releasable type so that if by any chance an explosion should occur in the combustion chamber of the heater, the door would automatically open to relieve the pressure and prevent serious damage. As the door is hinged at the top, gravity would cause the door to close following such an explosion.

Figure 2:
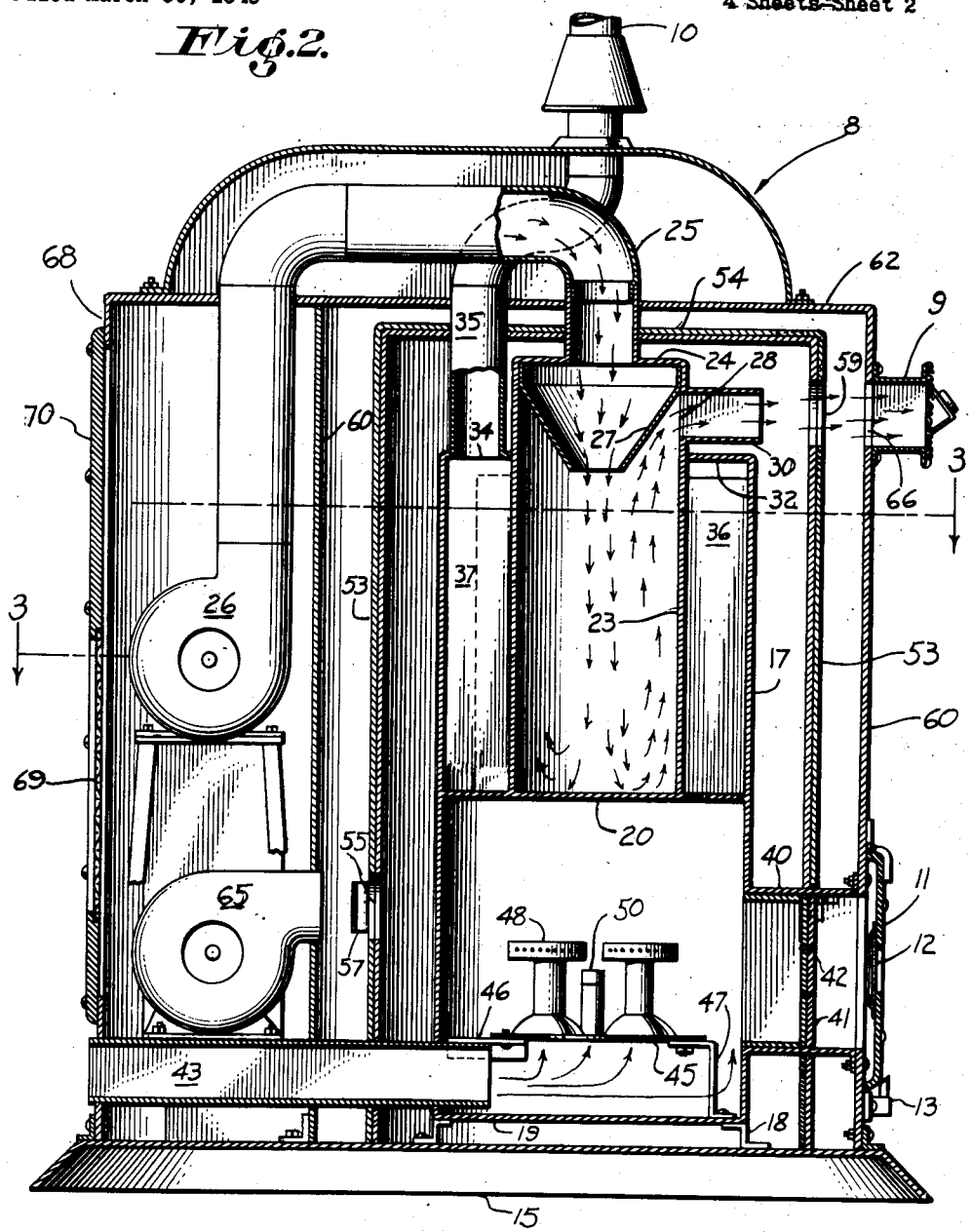
Fig. 2 is a view in vertical cross section of my improved heater.

Referring to Fig. 2, my improved heater 8 is mounted on a suitable base 15. Since the heater includes a number of generally concentric elements, the following description will commence with the innermost elements and progress outwardly to the exterior.

The inner portion of my heater comprises an elongated upright cylindrical member 17 that is supported by legs 18 resting on base 15. Member 17 is sealed at its lower end by a closure 19 that is spaced somewhat above the top of base 15, the space between the closure and the base being sufficient to permit free air circulation.

Cylindrical member 17 is transversely divided by a closure 20 into upper and lower compartments of substantially equal length, the closure 20 having a restricted opening 21 (Fig. 4) therein to provide communication between the compartments.

The upper compartment is divided into two separated spaces by means of an upright cylindrical member 23 of lesser diameter than member 17 and of somewhat greater length than the upper compartment of member 17. The space within member 23 is hereinafter sometimes referred to as the inner heating chamber. Cylindrical member 23 is telescoped into the upper compartment of member 17 in a concentric manner with the lower end of member 23 being sealed to closure 20. The upper end of member 23 has a closure 24 provided with a central opening that leads into an air inlet duct 25. This duct is connected to a suitably driven air blower 26 that may conveniently be located in the rear portion of the heater. As will be seen, blower 26 operates in response to the thermo-electric control system used with the heater.

An annular cone shaped member 27 is secured to the inner surface of member 23 at the top end thereof, the restricted opening of the member 27 being in alignment with the air inlet duct 25. Member 27 may be eliminated, if desired, in which case it would be desirable to extend duct 25 to a termination point well within cylindrical member 23.

Figure 4:
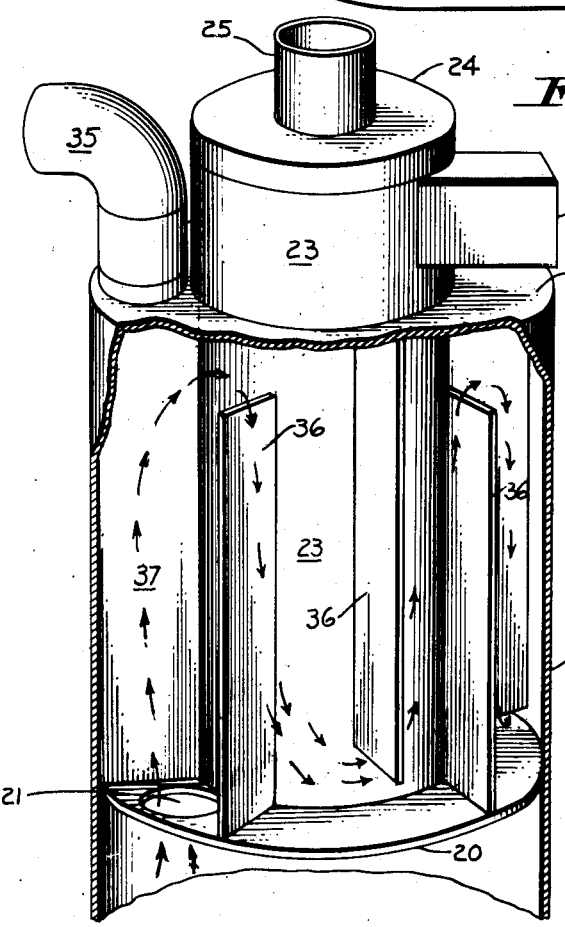
Fig. 4 is a perspective view, partly in broken away section, of a portion of the heater.

Member 23 has an air outlet opening 28 immediately below the junction of member 27 and member 23. An outlet duct 30 extends radially from opening 28, the duct terminating in a plane corresponding generally with the vertical plane of cylindrical member 17, as best shown in Figs. 2 and 4.

An annular closure 32 extends between the top of cylindrical member 17 and the outside surface of cylindrical member 23. Closure 32 has an opening 34 that leads into a duct 35 which is connected to the previously mentioned flue 10. The products of combustion pass off through this duct system.

Figure 3:
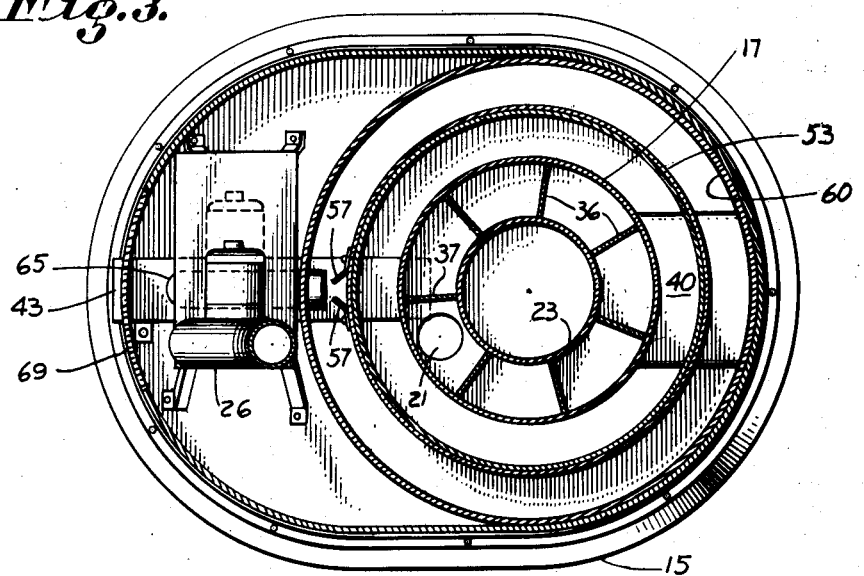
Fig. 3 is a sectional view on line 3—3 of Fig. 2.

The structure above described defines an annular chamber lying between cylindrical members 17 and 23, the chamber being closed at its two ends by the outer radial portion of closure 20 and annular closure 32, respectively. This chamber contains a plurality of radially spaced, vertical baffles 36 (Figs. 2, 3 and 4) which extend radially between members 17 and 23. Alternate baffles 36 have their upper ends sealed to closure 32, the opposite ends being spaced a short distance from closure 20. Intermediate baffles have their lower ends sealed to closure 20 and their opposite ends spaced from closure 32. One baffle, namely baffle 37, is in fact a partition that has its ends sealed respectively to closures 20 and 32. Partition baffle 37 lies in a vertical radial plane that extends between opening 21 in closure 20 and opening 34 in closure 32.

The above described inner heater construction is shown in my previously mentioned Patent No. 2,391,111 and copending patent application.

As there described, the air heated in the combustion chamber and the products of combustion are drawn upwardly through opening 21 in closure 20, an adequate updraft being provided by flue 10. The air and products of combustion then follow a tortuous path over one baffle 36, under adjacent baffle 36, over the next baffle 36, and so on (arrows in Fig. 4), until blocked from further travel by partition baffle 37. At this point, the draft causes flow of the mixture through duct 35 and flue 10 to the chimney. As explained in my prior patent and copending application, the heated air in following its tortuous path transfers its heat to the walls of the chamber, which heat passes through the chamber walls and is acquired by the cool air circulating against those walls, or is within the range of heat radiation from the walls.

As further explained in my prior patent and copending application, cool air is forced under pressure from blower 26 through duct 25 to the top of cylindrical member 23 where it is directed into a central stream by means of cone shaped member 27. The central stream flows downwardly, as indicated by the arrows in Fig. 2, and strikes bottom closure 20. Here the stream fans out and flows upwardly along the heated sides of member 23. The path of upward flow is an annulus surrounding the central path of downward flow. The air, in contacting closure 20 and the interior surface of member 23, is heated by contact with and radiations from those surfaces. The upwardly flowing air finally reaches the annular pocket defined by the upper inner surface of member 23 and the outer surface of member 27, from which pocket it is discharged through opening 28 and duct 30, as further indicated by the arrows.

The lower compartment of cylindrical member 17, the space below closure 20 (Fig. 2), is the combustion chamber of my heater.

The combustion chamber has two connections with the heater exterior, one a duct 40 leading from the chamber to front door 12. Intermediate the ends of duct 40 is an inner door 41 having a transparent section 42 in alignment with window 12 of the main front door. Use of inner door 41 is optional, but I have found that its presence has a substantial minimizing effect upon heat losses.

The other connection between the combustion chamber and the heater exterior is an air inlet duct 43 that extends from the rear of the heater to a point within the lower portion of the chamber. Duct 43 is preferably aligned with a radius of the cylindrical member 17, and it extends inwardly of the combustion chamber to a point short of the chamber center. This provides that the flowing air stream leaving the duct will be broken up at about the chamber center, a fact that favorably influences air distribution throughout the chamber, as will presently be seen. The following described circular plate acts upon the air stream to insure that the stream will be broken up at the proper point.

Figure 5:
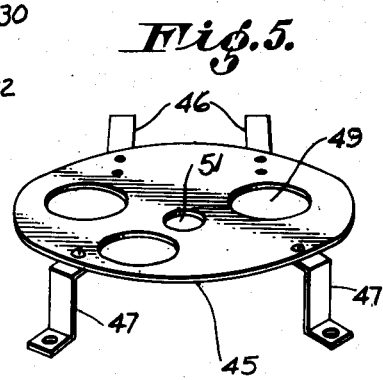
Fig. 5 is a perspective view of an element forming part of the heater.

A circular plate 45 of somewhat lesser diameter than member 17 is mounted concentrically within the combustion chamber in a horizontal plane that is substantially flush with the top of duct 43. This plate is shown in perspective in Fig. 5. Plate 45 may conveniently be provided with rearwardly extending lugs 46 that attach to the top of the portion of duct 43 extending within the chamber. Angle irons 47 including legs and feet may extend from circumferentially spaced points between the plate front and the bottom closure 19 of the chamber. The function of plate 45 from the standpoint of improving the combustion characteristics of my heater will be mentioned presently.

One or more gas burners 48 of a suitable conventional type are mounted on the upper surface of plate 45 in alignment with respective apertures 49 in the plate. A pilot burner 50 of conventional type is mounted on plate 45 above a central aperture 51 in operable relation to the burners 48. Gas is supplied to burners 48 and pilot burner 50 in a conventional manner, and, for simplicity, the gas conducting connections are not shown.

Duct 43, which is open at its external end to atmosphere and which is of proper size for the air requirements of the burners used, conducts a steady supply of air to the combustion chamber. As the duct passes through regions of the heater that under operating conditions are heated, the air is pre-heated and thus delivered to the combustion chamber in a condition ideal for combustion. This air, from the standpoint of its function in the combustion process, may be regarded as of two separate types. One type, here called primary air, passes upwardly through the apertures 49 and 51 and is mixed by means of mixing valves in the respective burners with the fuel gas in order to provide a desirable combustion mixture. The other type, the air in excess of that used for mixing (secondary air), circulates beneath plate 45 and then flows upwardly through the annular space between the periphery of plate 45 and the inner surface of member 17. The radial width of the annular space must be selected so as to bear proper relation to the air requirements of the particular burners 48 used.

The secondary air completely and uniformly fills the upper portion of the combustion chamber, thus avoiding air pockets that are harmful to combustion and insuring an adequate supply of air for substantially complete combustion and heat transfer. This air, of course, is heated as a result of its contact with and proximity to the burning fuel, and it eventually passes upward through aperture 21 in closure 20 and follows the tortuous path previously described.

Plate 45 is a critical feature in the successful operation of the combustion chamber, since without it, losses due to incomplete combustion and improper circulation of air in the chamber are substantial. Extensive experiments conducted both with and without the plate have established the above assertion beyond doubt.

It may be of interest to set forth typical temperatures experienced with my combustion air inlet and distribution arrangement. In practice, the temperature of the air entering duct 43 might be 60 degrees, the air temperature immediately below plate 45, 210°, and the air temperature just above and slightly inwardly of the plate periphery, 370°. The amount of pre-heating given to the primary and secondary air in my heater is thus apparent.

Continuing with a description of my improved heater, upright cylindrical member 17 is surrounded by a concentric cylindrical member, jacket 53, of greater diameter than member 17. The annular space between member 17 and jacket 53 is here called the intermediate chamber. The bottom of jacket 53 is sealed to base 15, and the jacket is capped at its upper end with a closure 54. Suitable openings are provided in closure 54 to permit passage of ducts 25 and 35, the edges of the openings being sealed to the duct exteriors.

Jacket 53 has an opening 55 located at a vertical level that is substantially opposite the midpoint of the vertical dimension of the combustion chamber. Opening 55 may be at the diametric rear of the jacket. A pair of opposed baffles 57 (Figs. 2 and 3) are mounted on jacket 53 on two opposed sides of opening 55, the baffles extending away from jacket 53 and defining an acute angle with each other.

As will later be seen, baffles 57 are disposed in a stream of air, and the purpose thereof is to separate the stream into two portions of predetermined size. One portion is permitted by the baffles to pass through opening 55 into the space between jacket 53 and circular member 17, the intermediate chamber.

The other portion of the stream, namely that which is excluded by baffles 57 from passing through opening 55, circulates in the presently to be described space on the outside of jacket 53. It has been found that proper setting of baffles 57, which as a practical matter is determined empirically, is somewhat critical to the proper operation of my heater. The use of my baffle arrangement eliminates the need for two separate ducts extending respectively from a blower to the intermediate and outer chambers. It also eliminates pressure losses incident to the flow of air through ducts.

Referring to the upper right hand corner of Fig. 2, jacket 53 has an air outlet opening 59 that is located in alignment with outlet duct 30 extending from inner cylindrical member 23.

A jacket 60, sometimes referred to as a second jacket, surrounds first jacket 53 in a concentric manner. Second jacket 60 is of greater diameter than jacket 53 and, accordingly, there is thus provided a space between the two jackets that will be referred to as the outer chamber of the heater. Second jacket 60 usually is sealed to base 15, particularly if the heater is located at a remote station. If, however, the heater is located in the space to be heated, sealing at the juncture of jacket 60 and base 15 is not particularly necessary. Duct 40, previously mentioned, is provided at its outer end with a flange which is sealed to the inner surface of jacket 60. The front door 11 is mounted on jacket 60 at the outer end of duct 40. The upper end of jacket 60 is provided with a closure 62 which has suitable openings for ducts 25 and 35. Closure 62 may be sealed to the duct exteriors.

A suitably driven air blower 65 is mounted in the rear portion of the heater, the blower outlet extending through an opening in second jacket 60 so as to direct a stream of air in line with opening 55 in jacket 53. This blower, operating in response to the thermo-electric control system used with my heater, provides the previously mentioned stream of air that is divided into two portions by baffles 57. As mentioned, the portion of the stream not admitted to the intermediate chamber through opening 55 circulates throughout the outer chamber.

Second jacket 60 has an outlet opening 66 located in alignment with opening 59 in first jacket 53 and the outlet duct 30 of cylindrical member 23. The main heater outlet duct 9 is mounted on jacket 60 around the opening 66.

Blowers 26 and 65 may be enclosed in a suitable housing 68, a grill 69 being provided adjacent the blower inlets so as to insure an adequate supply of air. Grill 69, which may be set in a door 70, may include a filter for removing foreign matter from the air. In a remote station installation, a cold air return duct leads from the space to be heated to the grill 69.

The foregoing sets forth the essential structural features embodied in my improved heater. The successful operation of the heater depends in large measure upon a system of automatic, thermo-electric controls. The individual controls themselves form no part of my invention, but in the interest of setting forth the complete operation of my heater, it is desirable to describe briefly a suitable control system.

Those skilled in the art will appreciate that suitable temperature responsive means may be provided which, if the pilot burner 50 is extinguished will shut off the supply of gas to both the pilot burner 50 and the main or heating burners 48.

The second gas valve, namely the one controlling the supply of gas to main burners 48, is normally also controlled by a thermostat located at a proper point in the space being heated. This thermostat is responsive to temperature existing in the space to be heated, and it is set to supply gas to main burners 48 when the temperature falls below a predetermined value, and it is set to shut off the gas supply when the temperature reaches or exceeds a predetermined value.

Figure 6:
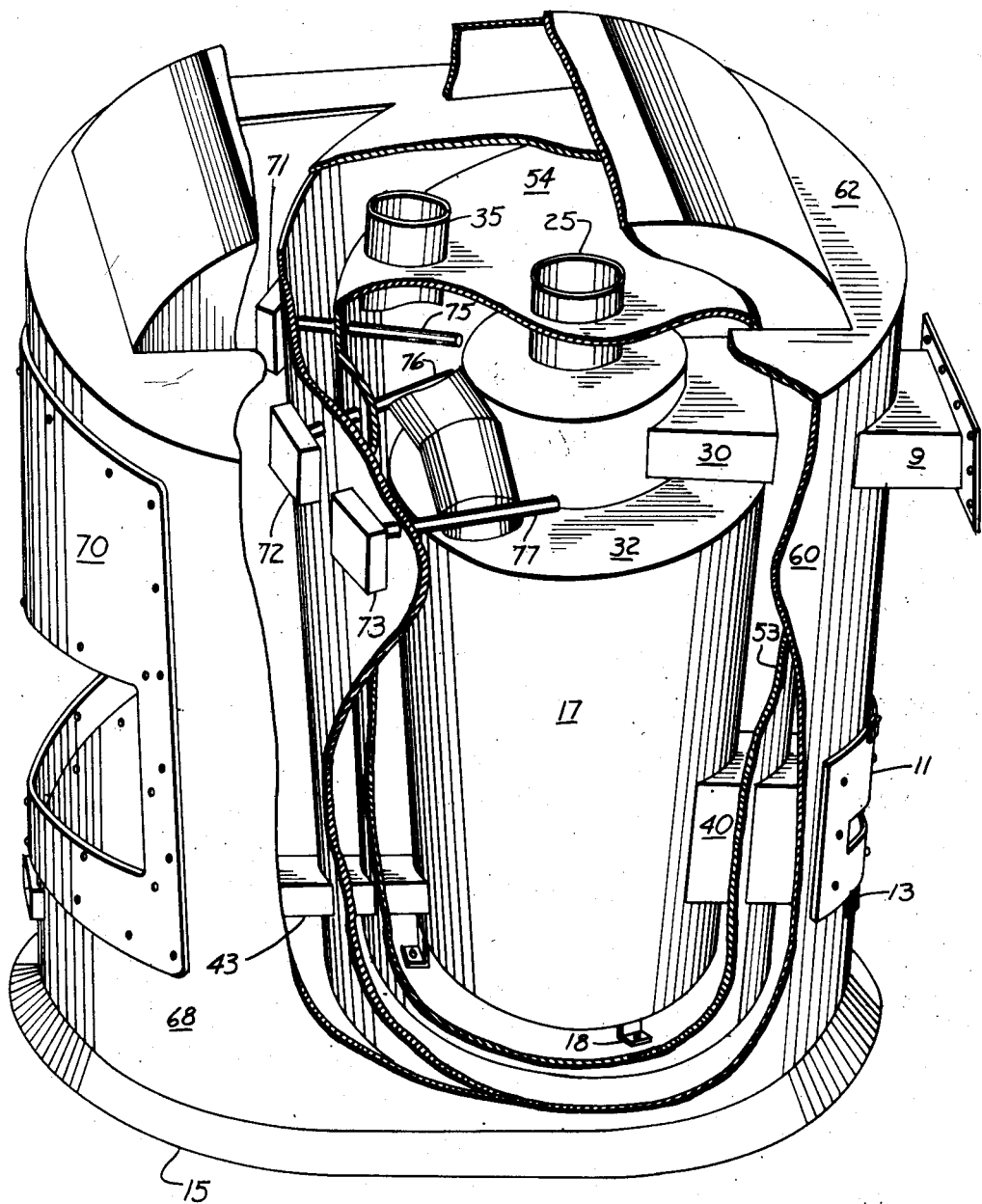
Fig. 6 is a perspective view, partly broken away, showing various details of the heater.

Referring to Fig. 6, the devices 71, 72 and 73 diagrammatically represent thermostatic controls that are respectively connected through pipes 75, 76 and 77 to thermal responsive elements located in the inner ends of the pipes. The thermal responsive elements thus are located in the previously described intermediate chamber.

Thermostatic control 71—75 controls the operation of blower 26, the blower that supplies cool air under pressure to the inner heating chamber, this chamber being the space within cylindrical member 23. As a practical example, this thermostat may be set at 110°, that is, the control operates to energize blower 26 when the temperature of the intermediate chamber increases above 110°, and it operates to deenergize the blower when the temperature falls below that value.

Thermostatic control 72—76 controls operation of blower 65. As a practical example, this contol may be set to energize the blower when the temperature of the intermediate space exceeds 180°. Conversely, when the temperature drops below 180°, the blower is deenergized.

As will be seen when an operating cycle of the heater is described, the temperatures in all the heating chambers, including the intermediate chamber which contains the temperature responsive elements, will vary over a considerable range during a cycle. Proper control of heater operation in response to these temperature variations is essential to the production of the economy of which my heater is capable.

Thermostatic control 73—77 is a safety device that operates only under emergency conditions. Use of such an emergency control is desirable because of the inherent dangers of heaters of this type. As an example, this control may be set for say 280°, a safe temperature that might be reached in the intermediate chamber in the event that one or both blowers ceased operation for some reason. Control 73—77 is operatively connected with the previously mentioned valve that controls the gas to main burners 48, and if the temperature should exceed the set, safe value, this valve would automatically close.

In the interest of a complete understanding of my invention, a brief description of the operation of the heater will now be set forth. In starting, it will be asumed that the temperature in the space to be heated is appreciably below the temperature for which the thermostat in the space is set. This condition insures that upon operation of pilot generator 50, the valve controlling the flow of gas to main burners 48 will be open.

The first step in heater operation involves manually opening the 100% cut-off valve and igniting pilot generator 50. The electric potential developed in generator 50 causes the 100% cut-off valve to remain open and thus permit gas to flow both to main burners 48 and the pilot generator. The pilot flame of the latter, of course, ignites the main burners. At this beginning point in heater operation, the temperatures in the various chambers of the heater are at a low value.

Concurrently with operation of the main burners 48, combustion air enters the combustion chamber through duct 43. As previously mentioned, this air divides and some of it is mixed with the gas and the rest of it circulates thoroughly and uniformly throughout the combustion chamber and insures substantially complete combustion. The character of this circulation effectively resists the formation of harmful air pockets.

The air directly heated in the combustion chamber passes through opening 21 in upper closure 20 of the combustion chamber and follows the tortuous path over and under the successive baffles 36. This air gives up its heat to the concentric cylindrical members 17 and 23 as well as to the baffles 36. The baffles, being in heat conducting contact with members 17 and 23, tend to transfer the heat acquired thereby to the members. By the time the air has reached the end of its tortuous path and passes off through duct 35 to flue 10, substantially all of the heat has been removed. Under proper operating conditions, flue 10 is no more than slightly warm to the touch.

Shortly after the main burners 48 are ignited, the temperature within the intermediate chamber (between member 17 and jacket 53) increases to the value at which the thermostat 71—75 controlling blower 26 is set. In the example given, this value is 110°. At this point, blower 26 begins operation to force cool air into the inner chamber within cylindrical member 23. The behavior of the air in this chamber has already been described. The air heated in this chamber passes outwardly through duct 30, opening 59, opening 66, and main outlet duct 9 to space, as indicated by the arrows in Fig. 2.

The temperature in the intermediate chamber continues to increase, and when it reaches a predetermined value, 180° in the example given, thermostat 72—76 operates to energize blower 65. This blower directs a stream of cool air into the outer chamber. As previously described, a portion of this stream passes between baffles 57 and through opening 55 into the intermediate chamber. This action starts a forced circulation of air through both the intermediate and outer chambers.

The stream of air in the intermediate chamber impinges on the heated wall of the combustion chamber, and it "scrubs" heat from the wall surrounding the combustion chamber. Both vertical walls of the intermediate chamber have, of course, been heated, and the air circulating throughout the chamber acquires heat both through actual contact with the walls and by radiation therefrom. The pressure under which the cool air is forced into the intermediate chamber, the pressure developed in the chamber as the air is heated, and an asperating effect created by the stream of air discharging from duct 30, all contribute to the proper discharge of the heated air from the chamber through opening 59 in the upper chamber wall. At this point the air is mixed with the stream of air that discharges from duct 30.

Similar activity occurs with respect to the portion of the air from blower 65 that enters the outer chamber and is prevented by baffles 57 from continuing on into the intermediate chamber. The outer chamber air circulates throughout the chamber and acquires heat by contact with and radiation from the chamber walls. Generally speaking, the heat acquired by the air in the outer chamber is substantially less than that acquired by the air in the intermediate chamber. The inlet pressure given to the air by blower 65, the pressure developed on heating, and the asperating effect on the air stream discharging from duct 30, all contribute to proper circulation within the outer chamber, and further cooperate to provide discharge through the opening 66 and duct 9. The air from the outer chamber, of course, mixes at the outlet with air discharging from duct 30 and from the intermediate chamber.

As will be seen, the air discharged from outlet duct 9 consists of air that has been heated in three discrete heating chambers, in each one of which air pressure and volume has been controlled. Also, in each chamber the air has been maintained in a continuous state of circulation, thereby bringing the air in contact with and in proximity to heated chamber walls. As a result, the air finally discharged from the heater has acquired substantially all the heat generated by the heat source.

There is of course a temperature gradient in the heater that extends from a high point in the combustion chamber to a low point at the heater exterior. Under ordinary conditions, the heater exterior normally is slightly warm to the touch. This temperature gradient is a result of the improved construction of my heater wherein a plurality of air spaces with moving air in each are provided. This construction eliminates in large measure the use of conventional insulation. Experiments have established the following as typical operating temperatures along the gradient: combustion chamber—over 600°, intermedichamber—270°, outer chamber—130°, and exterior wall—slightly warm to the touch. As previously mentioned, flue 10 also is slightly warm to the touch.

The operation of the heater so far described has reached the point where the main burners 48 are in "on" condition and both blowers are forcing air into the heater. This condition continues until the temperature in the space being heated reaches the value for which the thermostat located in the space has been set. When this temperature has been reached, the thermostat functions to shut off the supply of gas to main burners 48. Blowers 26 and 65, however, continue operation, and by so doing, heat contained in the metallic portions of the heater continues to be transferred to the air which in turn is conducted into space. Since no heat is at this time being generated by main burners 48, the temperature within the heater, and particularly within the intermediate chamber, drops. When, in the example given, the temperature drops below 180°, thermostatic control 72—76 functions to deenergize blower 65. As the temperature drops still further, to 110° in the example given, thermostatic control 71—75 functions to deenergize blower 26. The flame of pilot generator 50, of course, continues to operate so as to be available to re-ignite main burners 48 upon the commencement of the next cycle of operation.

Under certain circumstances I have found it desirable to provide an auxiliary gas burner in the combustion chamber. This burner, of size intermediate to that of a main burner and the pilot generator, burns continuously and affords what I call a "holding heat." I have found that through the use of such an auxiliary burner, further economies in gas consumption are effected. The same result, of course, could also be obtained by using a valve controlling gas flow to the main burners that has a position intermediate the "on" and "off" positions. Such a valve, while possible, is difficult to use because of the corresponding change that would have to be made at the burners in connection with mixing air with the fuel gas. Since such valves and variable mixers are not commercially available at the present time, the use of an auxiliary burner of intermediate size is suggested.

As previously mentioned, if through blower failure or other cause, the temperature of the intermediate chamber should exceed a predetermined safe value, such as 280°, thermostat 73—77 would function to close the valve that controls the supply of gas to main burners 48. Use of a control of this character affording an additional safety factor is necessary.

A heater constructed and operated in accordance with the foregoing description has been proved through actual tests and comparisons with other heaters operating under similar conditions to afford unusual economy in fuel consumption. My experiments have demonstrated an operating characteristic that I believe is unique with my heater. This characteristic involves a change in air pressure that occurs during heater operation. Using as a standard the air pressure in the space to be heated before operation of my unit, I have found that during operation, such air pressure takes a decided drop. This reduced air pressure phenomenon also is present in the inner chamber of my heater during operation. In brief, the pressures both in the space heated and in the inner chamber are substantially the same during heater operation, and they are reduced measurably from the values thereof when the heater is not operating. None of the other heaters I have tested exhibit this operating characteristic. Incidentally, my experiments were conducted with the aid of a conventional water barometer.

As mentioned, I have critically compared my heater with various gas heaters now commercially available. Test runs on my heater and commercial heaters of similar size installed in buildings of comparable size and of comparable thermal characteristics, have demonstrated that such commercial heaters consume, during a common period, about four times as much gas as is consumed by my heater. In one case, the tests were conducted over a three months' period.

From the above description it is thought that the construction and advantages of this invention will be readily apparent to those skilled in the art. Various changes and modifications may be made without departing from the spirit or losing the advantages of the invention.

Having thus described the invention, what I claim as new and desire to secure by Letters Patent is:

1. In a forced air heater having an elongated, upright first generally cylindrical member divided by a horizontal closure having a restricted opening into upper and lower compartments, the lower compartment forming a combustion chamber and having a heat generator therein, a second upright generally cylindrical member of lesser diameter than said first cylindrical member disposed concentrically within said upper compartment and sealed to said closure, said second cylindrical member being provided with an outlet opening disposed exteriorly of said first cylindrical member, means for forcing air into said second member through an inlet opening therein, an annular closure between the top of said first cylindrical member and the adjacent surface of said second member, said annular closure having an outlet for the products of combustion, and a series of radially disposed, vertical baffles within the annular space between the said cylindrical members, alternate baffles being sealed at one end to said circular closure with the other end spaced from said annular closure and the intermediate baffles being sealed at one end to said annular closure with the other end spaced from said circular closure, one of said baffles being sealed to both closures with said restricted opening being located in said annular space on one side of such baffle and said outlet for the products of combustion being located in said annular closure on the other side thereof, the combination therewith of a first jacket surrounding said elongated, upright first generally cylindrical member and providing except for a single inlet opening and a single outlet opening a sealed intermediate chamber between said member and said jacket, a second jacket surrounding said first jacket and providing an outer chamber between said first and second jackets, means for directing air under pressure into the lower portion of said outer chamber and a predetermined portion of such air into said intermediate chamber, and a heated air collecting and delivery means including an outlet duct for heated air leading from the upper portion of said second jacket, the single outlet opening of said first jacket and the single outlet opening of said second cylindrical member being aligned with said duct.

2. The combination of claim 1 wherein said means for directing a predetermined portion of air under pressure to said intermediate chamber comprises said single inlet opening in said first jacket and a pair of opposed baffles mounted on said jacket on the sides of said opening, said baffles extending into said outer chamber with an acute angle between them, the free edges of said baffles being spaced a predetermined distance.

3. A forced air heater including a central air heating container having an inlet opening and an outlet duct, air blower means for forcing air into said air heating container, a heat generator for heating said container, a first jacket surrounding said air heating container and outlet duct, said jacket providing except for a single inlet opening and a single outlet opening a sealed intermediate chamber between said container and said jacket, a second jacket surrounding said first jacket and having a single inlet opening in its lower portion and a single outlet opening in its upper portion, said second jacket providing an outer chamber between said first and second jackets, a second air blower means connected to the inlet of said second jacket for directing a stream of air to be heated into the lower portion of said outer chamber and a predetermined portion of the air from said blower means to the lower portion of said intermediate chamber through said single inlet opening of said first jacket, and a heated air collecting and delivery means including an outlet duct disposed exteriorly and leading from the outlet opening in the upper portion of said second jacket, the single outlet duct of said first jacket and the single outlet opening of said central air heating container being aligned with said outlet duct of said second jacket.

4. The combination of claim 3 wherein said means for directing a predetermined portion of the air from the blower means to said intermediate chamber comprises a pair of opposed baffles mounted on said first jacket on the sides of said inlet opening, said baffles extending into said outer chamber with an acute angle between them, the free edges of said baffles being spaced a predetermined distance.

5. A forced air heater comprising an upright closed container having an air and fuel inlet and adjacent its top a combustion products outlet, a smaller closed container mounted within the upper portion of said first container for direct contact with combustion products, said small container having a centrally located air inlet at its top and an air outlet duct in its side wall near the top, means for supplying air under pressure to said air inlet of said smaller container, a jacket surrounding the sides and top of said first container and having a single air inlet and a single air outlet, a second jacket surrounding said first jacket and having a single air inlet and a single air outlet, said jackets having their air inlets aligned with each other and their air outlets aligned, said air outlet duct terminating within said first jacket and being aligned with the air outlets of both jackets whereby the discharge of air therefrom ejects air from within said jackets.

6. A forced air heater comprising an upright closed container having an air and fuel inlet and adjacent its top a combustion products outlet, a smaller closed container mounted vertically and coaxially within the upper portion of said first container for direct contact with combustion products, said smaller container having a centrally located air inlet at its top and an air outlet duct in its side wall adjacent the top, means for supplying air under pressure to said air inlet of said smaller container, a jacket surrounding the sides and top of said first container and having a single air inlet and a single air outlet, a second jacket surrounding the sides and top of said first jacket and having a single air inlet and a single air outlet, said jackets having their air inlets aligned with each other adjacent the bottoms of said jackets and their outlets aligned, said air outlet duct terminating within said first jacket and being aligned with the air outlets of both jackets, said jacket outlets being larger than said duct whereby the discharge of air therefrom ejects air from within said jackets.

7. The combination of claim 6 together with means for supplying air under pressure to the air inlets of said jackets.

8. The combination of claim 6 together with means for supplying air under pressure to the air inlet of said latter jacket and baffles located on the exterior of said first jacket adjacent the air inlet thereof to control the amount of air entering therein.

LEO N. WALTER.

References Cited in the file of this patent

UNITED STATES PATENTS

| Number | Name | Date |
|---|---|---|
| 1,673,072 | Houghtby | June 12, 1928 |
| 1,911,760 | Lonergan | May 30, 1933 |
| 1,949,726 | McKee | Mar. 6, 1934 |
| 2,015,960 | Norris | Oct. 1, 1935 |
| 2,043,487 | Norris | June 9, 1936 |
| 2,478,069 | Walter | Aug. 2, 1949 |